United States Patent [19]

Sunda

[11] Patent Number: 5,027,220
[45] Date of Patent: Jun. 25, 1991

[54] IMAGE RECORDING APPARATUS USING A CRT AS A LIGHT SOURCE

[75] Inventor: Fumihiro Sunda, Nagoya, Japan

[73] Assignee: Brother Kogyo Kabushiki Kaisha, Nagoya, Japan

[21] Appl. No.: 496,009

[22] Filed: Mar. 20, 1990

[30] Foreign Application Priority Data

Apr. 24, 1989 [JP] Japan .................... 1-46908[U]

[51] Int. Cl.⁵ .................... H04N 5/84; H04N 9/79
[52] U.S. Cl. .................... 358/244; 358/345; 358/332
[58] Field of Search .......... 358/345, 244, 332, 331, 358/180

[56] References Cited

U.S. PATENT DOCUMENTS

| | | | |
|---|---|---|---|
| 4,399,209 | 8/1983 | Sanders et al. | 430/138 |
| 4,556,906 | 12/1985 | Dischert et al. | 358/180 |
| 4,636,693 | 1/1987 | Saruta | 335/213 |
| 4,712,909 | 12/1987 | Oshikoshi | 355/20 |
| 4,794,460 | 12/1988 | Shiota | 358/244 |
| 4,908,653 | 3/1990 | Sago et al. | 335/27 |
| 4,924,302 | 5/1990 | Shiota et al. | 358/332 |
| 4,930,144 | 5/1990 | Plut et al. | 378/99 |

FOREIGN PATENT DOCUMENTS 2203848 10/1988 United Kingdom .

*Primary Examiner*—Roy N. Envall, Jr.
*Assistant Examiner*—Thai Tran
*Attorney, Agent, or Firm*—Oliff & Berridge

[57] ABSTRACT

An image recording apparatus is disclosed which comprises a CRT on which an image produced by an external host computer is displayed. An image recording device records a copy image corresponding to the image displayed on said CRT on a photosensitive recording medium. A control unit controls a CRT driving device corresponding to an aspect ratio data so that the aspect ratio of the CRT is adjusted to that of an external CRT attached to the host computer.

18 Claims, 3 Drawing Sheets

IMAGE RECORDING APPARATUS USING A CRT AS A LIGHT SOURCE

BACKGROUND OF THE INVENTION

1. Field of the Invention

The present invention relates to an image recording apparatus which displays are image represented by a video signal produced by an image reader or a computer on the screen of a CRT (cathode-ray tube) and then exposes a photosensitive recording medium to the screen of the CRT which serves as a light source.

2. Description of Related Art

An image recording apparatus employing a CRT as a light source to record an image displayed on the CRT on a photosensitive recording medium is known. One embodiment of such an apparatus is disclosed in U.S. Pat. No. 4,712,909. The image recording apparatus disclosed in the above U.S. Pat. is provided with a computer and an internal CRT for displaying an image produced by the computer. A photosensitive recording medium is exposed to the image displayed on the CRT to record the image on the photosensitive recording medium. The image produced by the computer is displayed also on an external CRT. The operator is able to recognize the image to be recorded on the photosensitive recording medium by monitoring the image displayed on the external CRT.

It is desirable that the image recording apparatus is capable of receiving video signals from an external device to improve the utility of the image recording apparatus employing the CRT; that is, it is desirable that the image recording apparatus is capable of being connected to an optional external image producing apparatus, such as a computer or an image reader, and capable of recording an image represented by a video signal produced by the external image producing apparatus. In such a case, the operator is able to recognize the image to be recorded by monitoring the image displayed on the CRT of the external image producing apparatus.

The CRT included in a host computer as the external image producing apparatus connected to the image recording apparatus and operated by the operator for image production has an aspect ratio which is specific to the maker or the type of CRT of the host computer, while the internal CRT which serves as a light source of the conventional image recording apparatus, such as in the above-referenced U.S. Pat. No. 4,712,909, has a fixed aspect ratio. Accordingly, it has been impossible to adjust the aspect ratio of the internal CRT to that of the CRT of the host computer. When a video signal produced by the host computer corresponding to an image displayed on the external CRT attached to the host computer is displayed on an internal CRT which has an aspect ratio different from that of the external CRT, the following problems arise:

For example, when a video signal representing a circular pattern P1 as shown in FIG. 2(a) produced by the host computer is applied to the image recording apparatus, a vertically elongate, elliptical, pattern P2 as shown in FIG. 2(b) or a horizontally elongate, elliptical, pattern P3 as shown in FIG. 2(c) is displayed on the screen of the internal CRT serving as a light source. That is, an image recorded by the image recording apparatus is different from the image displayed on the screen of the CRT of the host computer.

SUMMARY OF THE INVENTION

Accordingly, it is an object of the present invention to provide an image recording apparatus capable of recording an image correctly corresponding to an image displayed on the CRT of an image producing apparatus regardless of any difference in aspect ratio between the CRT of the image producing apparatus and an internal CRT incorporated into the image recording apparatus as a light source.

According to the present invention, there is provided an image recording apparatus comprising: video signal receiving means for receiving a video signal; a cathode ray tube for displaying an image thereon; cathode ray tube driving means for making said cathode ray tube display said image represented by the video signal received by said video signal receiving means; image recording means for recording a copy image corresponding to the image displayed on said cathode ray tube on a photosensitive recording medium; aspect ratio data receiving means for receiving an aspect ratio data; and control means for controlling said cathode ray tube driving means according to the aspect ratio data received by said aspect ratio data receiving means, whereby the shape of the image displayed on said cathode ray tube is changed or corrected.

BRIEF DESCRIPTION OF THE DRAWINGS

The above and other objects, features and advantages of the present invention will become more apparent from reading the following description of a preferred embodiment taken in connection with the accompanying drawings, in which.

DETAILED DESCRIPTION OF THE PREFERRED EMBODIMENT

Figure 1:
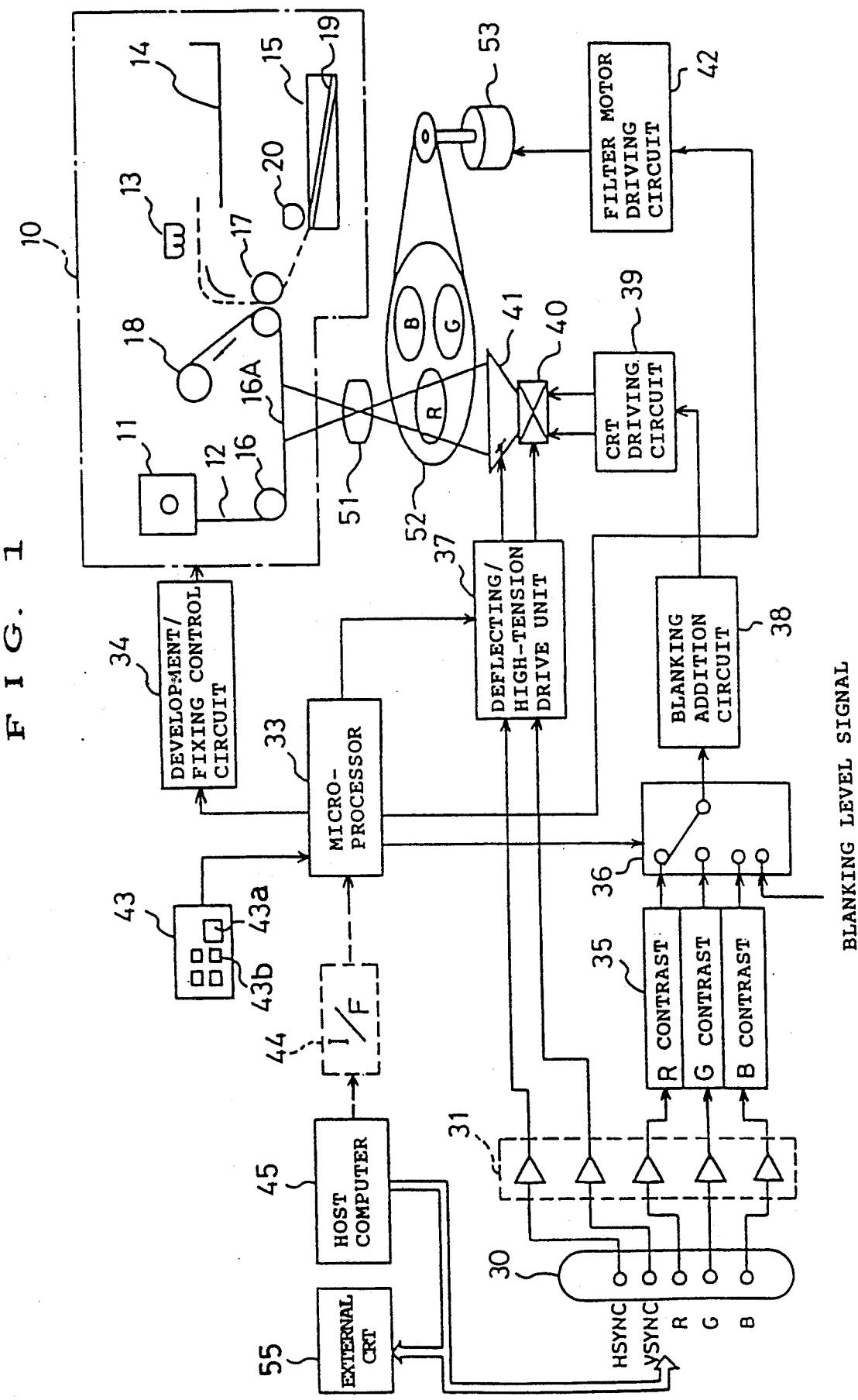
FIG. 1 is a block diagram of a preferred embodiment of an image recording apparatus according to the present invention.
Figure 2:
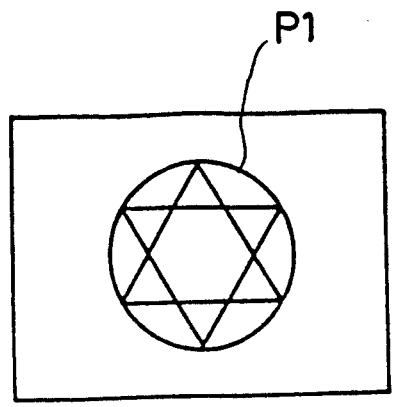
FIGS. 2(a), 2(b) and 2(c) are illustrations showing the distortion of an image attributable to a difference in aspect ratios.
Figure 2:
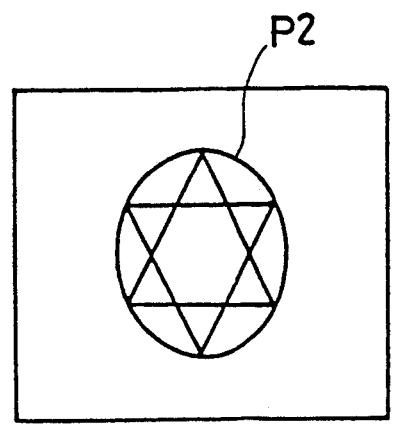
Figure 2:
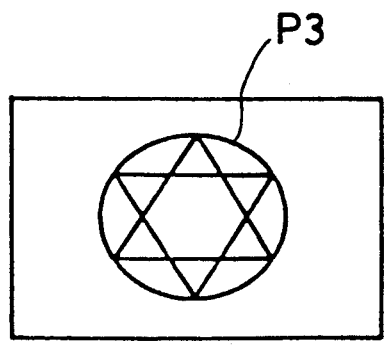

Referring to FIG. 1, a host computer, i.e., a graphic computer, 45 for producing an image generates a red-chrominance signal (hereinafter referred to as "R-chrominance signal") representing the red component of the image, a green chrominance signal (hereinafter referred to as "G-chrominance signal") representing the green component of the image, a blue chrominance signal (hereinafter referred to as "B-chrominance signal") representing the blue component of the image, and horizontal and vertical synchronizing signals for displaying the image represented by the R-, G- and B-chrominance signals on the screen of an internal CRT 41, which is a black-and-white CRT, which serves as the light source of the image recording apparatus. During the image producing operation of the host computer 45, the image is displayed on an external CRT 55 attached to the host computer 45.

The R-, G- and B-chrominance signals and the horizontal and vertical synchronizing signals are applied through a connector 30 respectively to the corresponding buffer amplifiers of a buffer amplifier unit 31 for amplification.

The amplified R-, G- and B-chrominance signals amplified by the buffer amplifier unit 31 are applied for contrast adjustment to a contrast control circuit 35 including R-, G- and B-contrast correctors. Then, the R-, G- and B-chrominance signals processed by the contrast correction circuit 35 are applied to a color changeover switch 36. Also applied to the color changeover switch 36 is a blanking level signal. The color changeover switch 36 selects one of the image signals or the blanking level signal.

The horizontal and vertical synchronizing signals amplified by the buffer amplifier unit 31 are applied to a deflecting high-tension drive unit 37. The current flowing through the deflecting coil 40 of the CRT 41 is controlled once every period of each synchronizing signal for so-called raster scanning.

Figure 3:
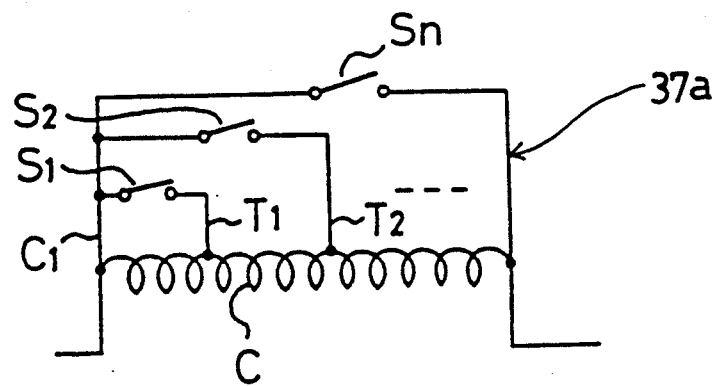
FIG. 3(a) is a circuit diagram of an amplitude setting coil circuit.
FIG. 3(b) is a circuit diagram of an amplitude setting resistor circuit.
Figure 3:
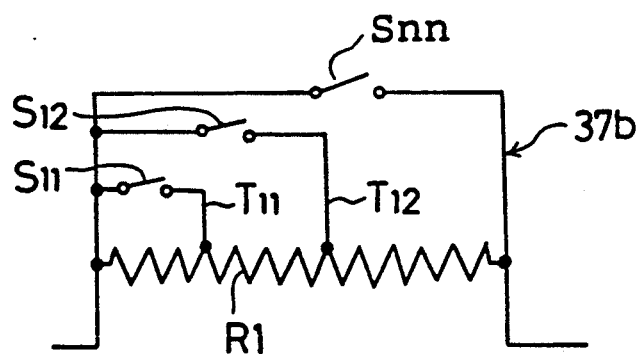

The deflecting high-tension drive unit 37 comprises an amplitude setting coil circuit 37a for setting the amplitude of horizontal deflection output current according to an external signal, and an amplitude setting resistor circuit 37b for setting the amplitude of vertical deflection output current according to an external signal. The aspect ratio of the CRT 41 is determined by setting the inductance of the amplitude setting coil circuit 37a and/or the resistance of the amplitude setting resistor circuit 37b. As shown in FIG. 3(a) by way of example, the amplitude setting coil circuit 37a comprises a coil C provided with a plurality of intermediate taps $T_1$, $T_2$, . . . , a plurality of switching elements $S_1$, $S_2$, . . . for short-circuiting one end $C_1$ of the coil C and the intermediate taps $T_1$, $T_2$, . . . in response to an external signal, and a switching element $S_n$ for short-circuiting the coil C. The amplitude setting coil circuit 37a shown in FIG. 3(a) is connected serially to a wellknown circuit of a horizontal deflecting yoke of CRT 41.

As shown in FIG. 3(b), the amplitude setting resistor circuit 37b, comprising a resistor R1 provided with a plurality of intermediate taps T11, T12, a plurality of switching elements S11, S12, . . ., and a switching element Snn for short circuiting the resistor R1, has a construction similar to that of the amplitude setting coil circuit 37a. The amplitude setting resistor circuit is connected in parallel to a wellknown amplifier circuit to drive a vertical deflecting yoke of CRT 41.

The chrominance signals and the blanking level signal selected by the color changeover switch 36 are transmitted through a blanking addition circuit 38 to a CRT driving circuit 39 to drive the CRT 41 by the chrominance signals.

A color filter unit 52 and a focusing lens 51 are disposed between the screen of the CRT 41 and an exposure zone 16A, which will be described afterward. An image displayed on the screen of the CRT 41 is transmitted through the color filter unit 52 and is focused on a photosensitive, pressure-sensitive paper 12 in the exposure zone 16A by the focusing lens 51 to expose the photosensitive recording paper 12. The color filter unit 52 has a red filter R, a green filter G and a blue filter B, which are brought to an active position by turns by a filter motor 53.

In an image forming unit 10, the photosensitive, pressure-sensitive paper 12 contained in the form of a roll in a cassette 11 is fed by a feed roller 16 to the exposure zone 16A. The photosensitive, pressure-sensitive paper 12 passes through the exposure zone 16A is pressed between pressing rollers 17 and is wound on a winding roller 18. Developing papers 19 contained in a developing paper container 15 are drawn out from the developing paper container 15 one by one by a rotary sector roller 20. The developing paper 19 is passed together with the photosensitive, pressure-sensitive paper 12 between the pressing rollers 17 with its developing surface in contact with the exposed surface of the photosensitive, pressure-sensitive paper 12. After passing the pressing rollers 17, the developing paper 19 is separated from the photosensitive, pressure-sensitive paper 12 and is delivered through a heat fixing unit 13 to a delivery tray 14. The feed roller 16, the pressing rollers 17, the winding roller 18 and the sector roller 20 are controlled for synchronous operation by a development and fixing control circuit 34.

An exposure starting key switch 43a and an aspect ratio assigning key switch 43b, which are provided on a console panel 43, are operated to give an exposure start signal and an aspect ratio data to a microprocessor 33. The microprocessor 33 then sets an aspect ratio, controls a filter motor driving circuit 42 for driving the filter motor 53 to control the color changing operation of the filter unit 52, controls the operation of the color changeover switch 36, and controls the development and fixing control circuit 34 to control the feed of the photosensitive, pressure-sensitive paper 12 and the developing paper 19. Thus, microprocessor 33 functions as control means for controlling the image displayed on CRT 41 based on aspect data received (from either console panel 43 or host computer 45) and based on the video signal received (by controlling color changeover switch 36).

Upon the reception of the exposure starting signal from the exposure starting key switch 43a, the microprocessor 33 decodes the aspect ratio data provided by the aspect ratio assigning key switch 43b, and turns on the switching element of the amplitude setting coil circuit 37a and/or the switching element of the amplitude setting resistor circuit 37b corresponding to the aspect ratio data to set the CRT 41 for an aspect ratio corresponding to the aspect ratio data. Consequently, the amplitude of the vertical deflection output current and/or the amplitude of the horizontal deflection output current is changed to set the CRT 41 for the aspect ratio corresponding to the aspect ratio data. Thus, the aspect ratio of the internal CRT 41 is adjusted to that of the external CRT 55 attached to the host computer 45.

Subsequently, an image forming process is carried out until the completion of a fixing process. After the completion of the image forming process, the image forming unit 10 stands ready to receive the next exposure starting signal from the exposure starting key switch 43a.

The image forming process will be described hereinafter. Upon the start of the image forming process, the microprocessor 33 gives a driving signal to the filter motor driving circuit 42 to actuate the filter motor 53. The filter motor 53 then locates the red filter R of the filter unit 52 on a path between the CRT 41 and the focusing lens 51. Subsequently, the microprocessor 33 gives a changeover signal to the color changeover switch 36 to change a connection of the contact from the blanking level signal for a connection of the contact to which the R-chrominance signal is applied through the contrast control circuit 35. Consequently, the R-chrominance signal is applied to the CRT driving circuit 39, and then the CRT driving circuit 39 drives the CRT 41 to display an R-monochromatic image corresponding to the R-chrominance signal. During the flyback time (the time between the end of a scan line and the beginning of the next scan line), the blanking addition circuit 38 holds the signal on a sufficiently low level to suppress the luminescence of the CRT 41.

The R-monochromatic image displayed on the screen of the CRT 41 is filtered by the red filter R of the filter unit 52 and is focused on the photosensitive, pressure-sensitive paper 12 by the focusing lens 51 for exposure. The photosensitive, pressure-sensitive paper 12 is fabricated, for example, as disclosed in U.S. Pat. No. 4,399,209, by coating a base paper with microcapsules of a light setting resin varying in hardness when exposed to light containing a photopolymerization initiator and a dye precursor. At this stage, the red filter R allows only the red component of the image to fall on the photosensitive, pressure-sensitive paper 12.

Similarly, the green filter G of the filter unit 52 is located on the path between the CRT 41 and the focusing lens 51, the changeover switch 36 selects the G-chrominance signal, and the green filter G allows only the green component of the image to fall on the photosensitive, pressure-sensitive paper 12. Subsequently, the blue filter B of the filter unit 52 is located on the path between the CRT 41 and the focusing lens 51, the changeover switch 36 selects the B-chrominance signal, and the blue filter B allows the blue component of the image to fall on the photosensitive, pressure-sensitive paper 12 to complete the exposure of the photosensitive, pressure-sensitive paper 12 to the component images of the three primary colors. In a region of the photosensitive, pressure-sensitive paper 12 corresponding to the exposure zone 16a, microcapsules irradiated by light harden and those not irradiated by light are not hardened. Thus, the latent image of the color image is formed on the photosensitive, pressure-sensitive paper 12.

Subsequent to the formation of the latent image, the microprocessor 33 gives control signals to the development and fixing control circuit 34. The development and fixing control circuit 34 then controls the feed roller 16 and the winding roller 18 to advance the photosensitive, pressure-sensitive paper 12. Upon the arrival of the leading end of the region carrying the latent image at a position immediately before the pressing rollers 17, the sector roller 20 is actuated to deliver the developing paper 19 from the developing paper container 15 to the pressing rollers 17. Upon the arrival of the leading edge of the developing paper 19 at a predetermined position before the pressing rollers 17, the pressing rollers 17 are brought into contact with each other. The feed roller 16, the winding roller 18 and the sector roller 20 are driven continuously, so that the developing paper 19 and the photosensitive, pressure-sensitive paper 12 are put together and are passed between the pressing rollers 17 with the surface of the developing paper 19 coated with the developer and the surface of the photosensitive, pressure-sensitive paper 12 carrying the latent image in contact with each other. As the developing paper 19 is pressed against the photosensitive, pressure-sensitive paper 12 by the pressing rollers 17, the hardened microcapsules remain uncrushed while the unhardened microcapsules are crushed, the latent image and the developer interact to develop the exposed region of the photosensitive, pressure-sensitive paper 12 to form a color image on the developing paper 19. The color image formed on the developing paper 19 is fixed by the heat fixing unit 13, and then the developing paper 19 carrying the color image is delivered to the delivery tray 14.

The feed roller 16 and the winding roller 18 are stopped and the pressing rollers 17 are separated from each other upon the completion of advancement of the photosensitive, pressure-sensitive paper 12 by a distance corresponding to the length of one picture frame. The sector roller 20 is stopped after one developing paper 19 has been fed.

After thus completing one cycle of the image forming process, the image forming unit 10 stands to wait for the next exposure starting signal, which is generated when the exposure starting key switch 43a is operated again.

Although the aspect ratio is assigned by operating the aspect ratio assigning key switch 43b on the console panel 43 in the foregoing embodiment, the aspect ratio may be assigned by operating the keyboard of the host computer 45 to give aspect ratio data through an interface circuit 44 to the microprocessor 33. The image recording apparatus functions in the same manner as described above to record an image represented by an image signal generated by a color image reader.

What is claimed:

1. An image recording apparatus comprising:
   video signal receiving means for receiving a video signal from an external image producing apparatus which is located external of said image recording apparatus;
   a cathode ray tube for displaying an image thereon;
   cathode ray tube driving means for making said cathode ray tube display an image represented by the video signal received by said video signal receiving means;
   image recording means for recording a copy image corresponding to the image displayed on said cathode ray tube on a photosensitive recording medium;
   aspect ratio data receiving means for receiving an aspect ratio data relating to an aspect ratio of the external image producing apparatus; and
   control means for controlling said cathode ray tube driving means according to the aspect ratio data received by said aspect ratio data receiving means, whereby a shape of the image displayed on said cathode ray tube corresponds to a shape of an image represented by the video signal which would be displayed by the external image producing apparatus.

2. An image recording apparatus according to claim 1, further comprising input means connected to said aspect ratio data receiving means for inputting the aspect ratio data.

3. An image recording apparatus according to claim 1, further comprising an interface connected to said aspect ratio data receiving means, wherein the aspect ratio data is supplied from the external image producing apparatus, which is located external of said image recording apparatus, to said aspect ratio data receiving means through said interface.

4. An image recording apparatus according to claim 1, wherein said image recording means is for recording the copy image on a photosensitive pressure sensitive sheet.

5. An image recording apparatus according to claim 4, wherein a latent image is formed on the photosensitive pressure sensitive sheet by an exposure to the image displayed on said cathode ray tube, the photosensitive pressure sensitive sheet reacts with a developer sheet when pressed with each other, and wherein said image recording means includes pressing means for pressing the photosensitive pressure sensitive sheet and the developer sheet, whereby the copy image is formed on the developer sheet.

6. An image recording apparatus according to claim 1, wherein said cathode ray tube driving means includes a deflecting coil for deflecting a cathode ray, and wherein said control means controls said deflecting coil.

7. An image recording apparatus according to claim 6, further comprising horizontal deflection means and vertical deflection means for controlling said deflecting coil to deflect the cathode ray in a horizontal direction and a vertical direction, respectively, and wherein said control means controls said horizontal deflection means and vertical deflection means according to the aspect ratio data.

8. An image recording apparatus according to claim 7, wherein said horizontal deflection means includes an amplitude setting coil circuit and said vertical deflection means includes an amplitude setting resistor circuit, and wherein said control means changes an inductance of said amplitude setting coil circuit and a resistance of said amplitude setting resistor circuit according to the aspect ratio data.

9. An image recording apparatus comprising:
video signal receiving means for receiving a video signal from a source which is located external of said image recording apparatus;
a cathode ray tube for displaying an image thereon;
image recording means for recording a copy image corresponding to the image displayed on said cathode ray tube on a photosensitive recording medium;
aspect ratio data receiving means for receiving an aspect ratio data determined according to an aspect ratio of the source; and
control means for controlling the image displayed on said cathode ray tube based on the aspect ratio data received by said aspect ratio data receiving means and the video signal received by said video signal receiving means so that a shape of the image displayed on said cathode ray tube corresponds to a shape of an image represented by the video signal which would be displayed by said source.

10. An image recording apparatus according to claim 9, further comprising input means connected to said aspect ratio data receiving means for inputting the aspect ratio data.

11. An image recording apparatus according to claim 9, further comprising an interface connected to said aspect ratio data receiving means wherein the source is an external image producing apparatus which is located external of said image recording apparatus and the aspect ratio data is supplied from the external image producing apparatus to said aspect ratio data receiving means through said interface.

12. An image recording apparatus according to claim 9, wherein said image recording means is for recording the copy image on a photosensitive pressure sensitive sheet.

13. An image recording apparatus according to claim 12, wherein a latent image is formed on the photosensitive pressure sensitive sheet by an exposure to the image displayed on said cathode ray tube, the photosensitive pressure sensitive sheet reacts with a developer sheet when pressed with each other, and wherein said image recording means includes pressing means for pressing the photosensitive pressure sensitive sheet and the developer sheet, whereby the copy image is formed on the developer sheet.

14. The image recording apparatus according to claim 9, further comprising cathode ray tube driving means for making said cathode ray tube display an image represented by the video signal received by said video signal receiving means, wherein said control means controls said driving means according to the aspect ratio data received by said aspect ratio data receiving means.

15. An image recording apparatus according to claim 14, wherein said cathode ray tube driving means includes a deflecting coil for deflecting a cathode ray, and wherein said control means controls said deflecting coil.

16. An image recording apparatus according to claim 15, further comprising horizontal deflection means and vertical deflection means for controlling said deflecting coil to deflect the cathode ray in a horizontal direction and a vertical direction, respectively, and wherein said control means controls said horizontal deflection means and vertical deflection means based on the aspect ratio data.

17. An image recording apparatus according to claim 16, wherein said horizontal deflection means includes an amplitude setting coil circuit and said vertical deflection means includes an amplitude setting resistor circuit, and wherein said control means changes an inductance of said amplitude setting coil circuit and a resistance of said amplitude setting resistor circuit based on the aspect ratio data.

18. An image recording apparatus comprising:
video signal receiving means for receiving a video signal from a source which is located external of said image recording apparatus;
a cathode ray tube for displaying an image thereon;
cathode ray tube driving means for making said cathode ray tube display an image represented by the video signal received by said video signal receiving means, said cathode ray tube driving means including a deflecting coil for deflecting a cathode ray;
image recording means for recording a copy image corresponding to the image displayed on said cathode ray tube on a photosenstive recording medium;
aspect ratio data receiving means for receiving an aspect ratio data relating to an aspect ratio of the source;
horizontal deflection means including an amplitude setting coil circuit for controlling said deflecting coil to deflect the cathode ray;
vertical deflection means including an amplitude setting resistor circuit for controlling said deflecting coil to deflect the cathode ray; and
control means for changing an inductance of said amplitude setting coil circuit and a resistance of said amplitude setting resistor circuit based on the aspect ratio data received by said aspect ratio data receiving means so that a shape of the image displayed by said cathode ray tube corresponds to a shape of an image represented by the video signal which would be displaced by said source.

* * * * *